United States Patent [19]

Müller et al.

[11] 4,162,296

[45] Jul. 24, 1979

[54] LIQUID-LIQUID EXTRACTION OF NICKEL

[75] Inventors: Wolfgang Müller, Mannheim; Lothar Witzke, Brühl; Werner Gottfried, Altlussheim, all of Fed. Rep. of Germany

[73] Assignee: Th. Goldschmidt AG, Essen, Fed. Rep. of Germany

[21] Appl. No.: 872,101

[22] Filed: Jan. 25, 1978

[30] Foreign Application Priority Data

Feb. 2, 1977 [DE] Fed. Rep. of Germany ....... 2704181

[51] Int. Cl.$^2$ ............................................. C01G 51/00
[52] U.S. Cl. .................................................... 423/139
[58] Field of Search ....................... 423/139, DIG. 14; 75/101 BE

[56] References Cited

U.S. PATENT DOCUMENTS

| 3,055,754 | 9/1962 | Fletcher | 423/139 |
| 3,193,381 | 7/1965 | George et al. | 423/139 |
| 3,666,446 | 5/1972 | Cook et al. | 423/139 |
| 4,011,297 | 3/1977 | Nyman et al. | 423/139 |

*Primary Examiner*—Brian Hearn
*Attorney, Agent, or Firm*—Toren, McGeady and Stanger

[57] ABSTRACT

A method for extracting nickel from aqueous solutions thereof which contain large amounts of alkali metal ions by contacting the aqueous solution with an extraction agent comprising an organic solution of di-2-ethylhexyl phosphoric acid and naphthenic acid.

6 Claims, No Drawings

LIQUID-LIQUID EXTRACTION OF NICKEL

BACKGROUND OF THE INVENTION

1. Field of the Invention

This invention pertains to the field of the extraction of nickel from aqueous solutions thereof by liquid-liquid extraction.

2. Description of the Prior Art

Benzophenone oxime and 8-hydroxyquinoline derivatives are known agents for the extraction of nickel from aqueous ammoniacal solutions or solutions containing ammonium. The use of these extraction agents, among others, is reported in Chemical Abstracts, Volume 82, No. 26, Report 173 986.

The use of these agents requires the presence of ammonium ions which remain in the refined product. In processes without circulation in the aqueous stage, this proves disadvantageous because it causes environmental pollution and is expensive.

Another group of extraction agents consists of materials, such as, phosphoric acid esters of which the di-2-ethylhexyl phosphoric acid is especially important and naphthenic acid which is especially suitable to extract nickel from ammonium-free solutions in the pH range of 4 to 8. The use of these extraction means, among others, is described in the Journal of Inorganic Nuclear Chemistry, 1974, Vol. 36, page 189 to 192, Pergamon Press, printed in Great Britain.

The use of di-2-ethylhexyl phosphoric acid is disadvantageous since in the extraction, the alkali salts of the acid must be formed or the alkali salts are formed at increased pH values (pH>4) and therefore, a high content of alkali is obtained which is very difficult to displace by nickel. The extraction is made more difficult when the aqueous stage already contains a significant concentration of sodium ions from preceding stages of use of the solution. This can be immediately concluded from the law of mass action shown in the following equation:

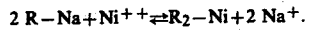

$$2R-Na + Ni^{++} \rightleftharpoons R_2-Ni + 2 Na^+.$$

The naphthenic acid acts differently since it extracts nickel only at the relatively high pH values of 7 to 8, however the alkali ions are completely displaced by nickel. In this method of employing the naphthenic acid as an extraction agent, the especially slow extraction speed, i.e., greater than 30 minutes, has a continuous effect until the nickel is separated. However, this slow extraction speed does not provide a practical technical method. The reason for this is seen in the fact that the nickel, at pH 7 to 8, is already partially separated as nickel hydroxide.

Thus, a method for obtaining nickel from solutions having especially large contents of alkali salts in the organic stage and, therefore, in the nickel strip eluate resulting therefrom was desired. The method of choice was the liquid-liquid extraction of nickel at a speed suitable for practical processing and, at the same time, possessing a distribution coefficient as high as possible to insure a practically complete displacement of the alkali content.

SUMMARY OF THE INVENTION

According to the present invention, these results are successfully accomplished by using a mixture of di-2-ethylhexyl phosphoric acid and naphthenic acid as the extraction agent. While it was surprising that in the combination of these two extraction agents the advantages of the two individual agents were retained, it was unexpected that such a mixture would avoid the disadvantageous properties of each separate agent but still possess both the fast extraction speed of the di-2-ethylhexyl phosphoric acid as well as the good distribution coefficient of the naphthenic acid. The mixture to be used according to the invention is preferably employed in the concentrations of 1 to 10 and preferably about 3 to 7% by volume of di-2-ethylhexyl phosphoric acid and 3 to 30 and preferably about 10 to 20% by volume of naphthenic acid.

Numerous solvents can be used as the solvent in this mixture. Suitable petroleum solvents include kerosenes or benzines which are low in aromatic substances and have a boiling range of about 190° to 240° C., e.g., Shellsole K. Other suitable solvents are high-boiling aromatic solvents, such as, trimethylbenzene or xylene.

DESCRIPTION OF THE PREFERRED EMBODIMENT

By means of the mixture of the present invention, it is possible to extract nickel from aqueous solutions containing nickel and large amounts of alkali salts or from rinsing water. Two to four extraction steps with less than 5 minutes contact time each in the pH-range of 5 to 8, preferably 6 to 7.5, bring the residual nickel content in the refined product down to less than 1 mg/l. Subsequently, the Ni-charged organic stage is stripped by means of mineral acids to obtain Ni-stripping eluates whose Ni/Na-ratio is >10,000 and Ni content is >10%. Suitable mineral acids are hydrochloric acid, nitric acid and sulfuric acid.

In the following example, the effect of the mixture to be used according to the invention is demonstrated. This example clearly shows that a Ni-strip eluate is obtained in a very short time with the present invention. This eluate contains a satisfactory yield of nickel and only an insignificant amount of sodium.

EXAMPLE 1

To 1 liter of a mixture of
80% by volume kerosene,
14% by volume naphthenic acid (neutralization No. 220),
5% by volume di-2-ethylhexyl phosphoric acid, in a mixer are added, four times in succession, four separate volumes of 1 liter each of an aqueous solution, each volume containing
5.6 g Ni/l
43 g Na/l
45 g Cl/l
31 g SO$_4$
and having a pH of 6.0.

Then, while mixing each volume and adding a NaOH-solution, the pH value is adjusted to 6.5 to 6.7. The extraction for each volume is continued for 5 minutes.

After stopping the mixer, the stages completely separate within one to two minutes.

The lower stage of the refined product is discharged from the mixer and the next volume of the aqueous solution is added and treated in the same manner. The one liter stages of the refined aqueous products obtained after each extraction contain, sequentially, 0.01, 1.0, 2.8, and 4.8 g Ni/l. The organic stage, after the fourth extraction, contained 13.8 g Ni/l and was stripped with 70 ml of hydrochloric acid (20% by weight). The stripping was finished after approximately five minutes.

After these stages have been separated, a Ni-strip eluate is obtained with 185 g Ni/l and 0.015 g Na/l and with a pH value of 1.9. After a second stripping with 70 ml of hydrochloric acid (20% by weight) for the removal of the remaining nickel, the organic stage still contained 0.2 g Ni/l.

Comparative Examples 1 and 2 show the separate employment of di-2-ethylhexyl phosphoric acid and of naphthenic acid according to the prior art. These examples clearly show that in using di-2-ethylhexyl phosphoric acid, the extraction speed is satisfactory but the alkali content is very large.

The use of naphthenic acid as an extraction agent has the reverse effect. In this case, the separation of alkali is superior but the extraction speed is so low that it is not practical to use this material.

COMPARATIVE EXAMPLE 1

To one part by volume of an organic stage consisting of 20% by volume of di-2-ethylhexyl phosphoric acid and 80% by volume of kerosene, one part by volume of an aqueous solution containing 5.6 g Ni/l, 43 g Na/l, 45 g Cl/l and 31 g $SO_4$/l is added four times in succession. At the same time, soda lye is added with mixing at room temperature until a constant pH-value of 5.5 is obtained. Each extraction process was finished in approximately five minutes.

Four portions of refined products were obtained with increasing Ni-concentrations of 0.7, 2.8, 5.3, and 5.6, respectively. The subsequent re-extraction with 20% hydrochloric acid resulted in a strip eluate containing 74 g Ni/l and 25 g Na/l.

COMPARATIVE EXAMPLE 2

To 1 part by volume of an organic stage consisting of 14% volume of naphthenic acid (neutralization No. 220) and 86% by volume of kerosene, two parts by volume of an aqueous stage are added containing 6 g Ni/l, 57 g NaCl/l and 139 g $Na_2SO_4$/l. A 32% solution of NaOH was added dropwise, with mixing, at room temperature and in such a manner that the pH value did not exceed 7.5. The NaOH was added until this pH value remained constant.

The course and the speed of the extraction were observed on a pH recording instrument. More than 90 minutes had elapsed until the completion of the extraction. After separating the aqueous stage whose nickel content was 0.05 g/l, ½ part by volume of the aqueous initial solution was again mixed into the charged organic stage. As a result, the pH value of the emulsion dropped to 7.0. The strip eluate subsequently obtained by means of 20% hydrochloric acid contained 100 g Ni/l and 1.0 g Na/l.

What is claimed is:

1. In a method for the liquid-liquid extraction of nickel from aqueous solutions thereof which contain alkali metal ions wherein the aqueous solution is contacted with an organic phase containing an extraction agent, the improvement which comprises the organic phase containing from about 1 to 10 parts by volume of di-2-ethylhexyl phosphoric acid and from about 3 to 30 parts by volume of napthenic acid, and wherein extraction is carried out by contacting up to four separate volumes of the aqueous solution sequentially with the same organic phase and then stripping the nickel-charged organic phase to produce a nickel containing eluate, and wherein separate extractions are each carried out at a pH in the range from about 6 to 7.5 for a period of less than five minutes each.

2. The method of claim 1 wherein the solvent in the organic phase is kerosene.

3. The method of claim 1 wherein the stripping agent is a mineral acid.

4. The method of claim 3 wherein the stripping agent is a solution of HCl.

5. The method of claim 1 wherein the amount of di-2-ethylhexyl phosphoric acid is from about 3 to 7% by volume and the amount of naphthenic acid is from about 10 to 20% by volume.

6. The method of claim 1 wherein the nickel-charged organic phase is stripped with mineral acids to produce a nickel containing strip eluate having an Ni/Na ratio of more than about 10,000 and a nickel content of more than 10%.

* * * * *